(12) United States Patent
Sugiyama (10) Patent No.: US 9,493,081 B2
(45) Date of Patent: Nov. 15, 2016

(54) POWER SUPPLY SYSTEM, VEHICLE EQUIPPED WITH THE SAME, AND CONTROL METHOD FOR POWER SUPPLY SYSTEM

(71) Applicant: TOYOTA JIDOSHA KABUSHIKI KAISHA, Toyota-shi, Aichi-ken (JP)

(72) Inventor: Yoshinobu Sugiyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 329 days.

(21) Appl. No.: 14/199,207

(22) Filed: Mar. 6, 2014

(65) Prior Publication Data

US 2014/0183942 A1    Jul. 3, 2014

Related U.S. Application Data

(63) Continuation of application No. PCT/JP2011/075420, filed on Nov. 4, 2011.

(51) Int. Cl.
*B60L 11/18* (2006.01)
*B60L 11/12* (2006.01)
(Continued)

(52) U.S. Cl.
CPC ............ *B60L 11/1811* (2013.01); *B60L 1/003* (2013.01); *B60L 11/005* (2013.01); *B60L 11/123* (2013.01);
(Continued)

(58) Field of Classification Search
CPC .. H02M 3/073; H02M 3/315; H02M 3/3155; H02M 3/33592; H02M 3/3372; H02M 3/3376; H02M 3/3378; H02M 5/4505; H02M 5/458; H02M 5/4585; H02M 7/525; H02P 9/305; H05G 1/20; H05G 1/32; Y02B 70/126; Y02B 70/1433; Y02E 60/721; Y02T 10/6217; Y02T 10/06; Y02T 90/121; Y02T 90/127; Y02T 90/128; Y02T 90/14; Y02T 90/163; Y02T 90/169; B60L 1/003; B60L 11/005; B60L 11/123; B60L 11/14; B60L 11/1811; B60L 11/1842; B60L 11/1844; B60L 11/1846; B60L 11/1862; B60L 11/1868; B60L 15/007; B60L 2210/12; B60L 2210/14; B60L 2210/40; B60L 2240/80; B60L 16/03; B60L 16/0315; Y04S 10/126; Y04S 30/14
USPC ...... 307/21; 322/28, 73; 327/73; 363/34, 25, 363/28
See application file for complete search history.

(56) References Cited

U.S. PATENT DOCUMENTS 8,415,825 B2 * 4/2013 Hirose .................. B60K 6/445
180/271
2009/0192655 A1    7/2009 Ichikawa et al.
(Continued)

FOREIGN PATENT DOCUMENTS

JP    2004-236472 A    8/2004
JP    2008-236902 A    10/2008
(Continued)

*Primary Examiner* — Thienvu Tran
*Assistant Examiner* — Brian K Baxter
(74) *Attorney, Agent, or Firm* — Oliff PLC (57) ABSTRACT

A power conversion unit including a bidirectional converter, a sub DC-DC converter, and a main DC-DC converter selectively performs first power conversion converting power supplied from outside of a vehicle into charging power for a power storage unit, and second power conversion converting power stored in the power storage unit into output power to the outside of the vehicle. When charging of the power storage unit from the outside of the vehicle is performed in an emergency where power or a power amount to be output to the outside of the vehicle when the second power conversion is performed is requested to be greater than usual, the power conversion unit performs the first power conversion such that a state quantity indicating a state of charge of the power storage unit becomes greater than usual.

7 Claims, 6 Drawing Sheets (51) Int. Cl.
  *B60L 11/14*   (2006.01)
  *B60L 15/00*   (2006.01)
  *B60L 1/00*    (2006.01)
  *B60L 11/00*   (2006.01)

(52) U.S. Cl.
  CPC ............ B60L 11/14 (2013.01); B60L 11/1842 (2013.01); B60L 11/1844 (2013.01); B60L 11/1846 (2013.01); B60L 11/1862 (2013.01); B60L 11/1868 (2013.01); B60L 15/007 (2013.01); *B60L 2210/12* (2013.01); *B60L 2210/14* (2013.01); *B60L 2210/40* (2013.01); *B60L 2240/80* (2013.01); *Y02E 60/721* (2013.01); *Y02T 10/6217* (2013.01); *Y02T 10/645* (2013.01); *Y02T 10/7005* (2013.01); *Y02T 10/7022* (2013.01); *Y02T 10/7044* (2013.01); *Y02T 10/7066* (2013.01); *Y02T 10/7072* (2013.01); *Y02T 10/7077* (2013.01); *Y02T 10/7225* (2013.01); *Y02T 10/7233* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

| | | | |
|---|---|---|---|
| 2010/0001866 A1* | 1/2010 | Ichikawa | B60L 11/1875 340/584 |
| 2010/0076825 A1* | 3/2010 | Sato | B60L 3/12 705/14.1 |
| 2010/0133900 A1 | 6/2010 | King | |
| 2011/0121779 A1 | 5/2011 | Ichikawa et al. | |
| 2011/0266871 A1 | 11/2011 | Thisted | |
| 2011/0309674 A1* | 12/2011 | Kamachi | B60L 1/006 307/10.1 |
| 2012/0032505 A1* | 2/2012 | Kusumi | B60L 11/123 307/10.1 |
| 2012/0133204 A1 | 5/2012 | Ang et al. | |
| 2013/0134908 A1* | 5/2013 | Sugiyama | B60L 11/14 318/3 |
| 2013/0200846 A1 | 8/2013 | Ang | |

FOREIGN PATENT DOCUMENTS

| | | |
|---|---|---|
| JP | A-2009-148070 | 7/2009 |
| JP | A-2010-35277 | 2/2010 |
| WO | WO 2011/024285 A1 | 3/2011 |
| WO | 2011/128750 A2 | 10/2011 |
| WO | WO 2012/053084 A1 | 4/2012 |

\* cited by examiner

POWER SUPPLY SYSTEM, VEHICLE EQUIPPED WITH THE SAME, AND CONTROL METHOD FOR POWER SUPPLY SYSTEM

This is a continuation application of International Patent Application No. PCT/JP2011/075420 filed on Nov. 4, 2011, the entire contents of which are hereby incorporated by reference.

BACKGROUND OF THE INVENTION

Field of the Invention

The present invention relates to a power supply system, a vehicle equipped with the same, and a control method for the power supply system, and in particular to a power supply system which is mounted in a vehicle and can supply and receive electric power to and from the outside of the vehicle, the vehicle equipped with the same, and a control method for the power supply system.

Description of the Background Art

In recent years, electric vehicles, hybrid vehicles, and the like have received attention as environment-friendly vehicles. These vehicles are equipped with a motor generating a traveling drive force, and a power storage device storing electric power to be supplied to the motor. A hybrid vehicle is a vehicle equipped with an internal combustion engine and a motor serving as motive power sources.

In such vehicles, a vehicle including a power storage device which can be charged by a power supply outside the vehicle (hereinafter also referred to as an "external power supply", and charging of a power storage device by an external power supply will be also referred to as "external charging") has been known. For example, electric power is supplied from a general household power supply to the power storage device by connecting a power outlet provided in a house and a charging inlet provided in the vehicle using a charging cable.

On the other hand, a vehicle which can supply electric power stored in a vehicle-mounted power storage device to an external power supply or an electric load outside the vehicle has also been known (hereinafter, power feeding from a power storage device to an external power supply or an electric load outside a vehicle will also be referred to as "external discharging"). For example, Japanese Patent Laying-Open No. 2010-35277 (Patent Document 1) discloses a charging/discharging system for an electrically powered vehicle which can perform external charging and can also perform external discharging (see Patent Document 1).

SUMMARY OF THE INVENTION

For a vehicle which can charge a vehicle-mounted power storage device using an external power supply and which can supply electric power stored in the vehicle-mounted power storage device to the external power supply or an electric load outside the vehicle, it is a problem to be able to output power (W) or a power amount (Wh) to the outside of the vehicle, in an emergency such as when a commercial system power supply fails, or upon a user's request, so as to be greater than usual (i.e., other than in an emergency, or when there is no user's request). Such a problem and concrete means for solving the problem are not particularly considered in Patent Document 1.

Accordingly, one object of the present invention is to be able to output, in a power supply system which can supply and receive electric power to and from the outside of a vehicle and the vehicle equipped with the same, power or a power amount which is greater than usual to the outside of the vehicle, in an emergency or upon a user's request.

Further, another object of the present invention is to be able to output, in a control method for a power supply system which can supply and receive electric power to and from the outside of a vehicle, power or a power amount which is greater than usual to the outside of the vehicle, in an emergency or upon a user's request.

According to the present invention, provided is a power supply system mounted in a vehicle, including a chargeable/dischargeable power storage unit and a power conversion unit. The power conversion unit selectively performs first power conversion converting power supplied from outside of the vehicle into charging power for the power storage unit, and second power conversion converting power stored in the power storage unit into output power to the outside of the vehicle. When charging of the power storage unit from the outside of the vehicle is performed by the power conversion unit in a predetermined situation where power or a power amount to be output to the outside of the vehicle when the second power conversion is performed is requested to be greater than usual, the power conversion unit performs the first power conversion such that a state quantity indicating a state of charge of the power storage unit becomes greater than usual.

Preferably, the power storage unit includes first and second power storage devices. The first power storage device stores power for traveling. The second power storage device stores power for an auxiliary machine. When the charging of the power storage unit is performed by the power conversion unit in the predetermined situation, the power conversion unit performs the first power conversion such that a state quantity indicating a state of charge of the second power storage device becomes greater than usual.

More preferably, the power conversion unit includes first to third power conversion devices. The first power conversion device selectively performs third power conversion converting the power supplied from the outside of the vehicle into charging power for the first power storage device, and fourth power conversion converting power stored in the first power storage device into the output power to the outside of the vehicle. The second power conversion device selectively performs fifth power conversion converting the power supplied from the outside of the vehicle into charging power for the second power storage device, and sixth power conversion converting power stored in the second power storage device into the output power to the outside of the vehicle. The third power conversion device converts the power stored in the first power storage device into the power for the auxiliary machine. The second power conversion device has a power rating lower than that of the third power conversion device. The power supply system further includes a control device controlling the first to third power conversion devices. When the charging of the power storage unit is performed by the power conversion unit in the predetermined situation, the control device switches between a first charging path for charging the second power storage device using the second power conversion device and a second charging path for charging the second power storage device using the first and third power conversion devices, depending on efficiency during the charging of the power storage unit from the outside of the vehicle.

More preferably, the control device calculates a first charging time indicating a charging time for charging the first power storage device by the first power conversion device, and a second charging time indicating a charging time for charging the second power storage device by the second power conversion device, and when the first charging time is longer than the second charging time, the control device selects the first charging path, and when the second charging time is longer than the first charging time, the control device selects the second charging path.

Preferably, the predetermined situation is a situation during a power failure of a commercial system power supply to which an electric load receiving the power output from the vehicle when the second power conversion is performed is connected.

Preferably, the power supply system further includes an input manipulation unit. The input manipulation unit allows a user to request that the power or the power amount to be output to the outside of the vehicle when the second power conversion is performed be greater than usual. The predetermined situation is a situation where the input manipulation unit is manipulated by the user.

Further, according to the present invention, provided is a vehicle including any power supply system described above.

Furthermore, according to the present invention, provided is a control method for a power supply system mounted in a vehicle. The power supply system includes a chargeable/dischargeable power storage unit and a power conversion unit. The power conversion unit selectively performs first power conversion converting power supplied from outside of the vehicle into charging power for the power storage unit, and second power conversion converting power stored in the power storage unit into output power to the outside of the vehicle. The control method includes the steps of: determining whether or not there arises a predetermined situation where power or a power amount to be output to the outside of the vehicle when the second power conversion is performed is requested to be greater than usual; determining whether or not charging of the power storage unit from the outside of the vehicle is performed by the power conversion unit; and, when the charging of the power storage unit is performed by the power conversion unit in the predetermined situation, performing the first power conversion such that a state quantity indicating a state of charge of the power storage unit becomes greater than usual.

Preferably, the power storage unit includes first and second power storage devices. The first power storage device stores power for traveling. The second power storage device stores power for an auxiliary machine. The step of performing the first power conversion includes the step of performing the first power conversion, when the charging of the power storage unit is performed by the power conversion unit in the predetermined situation, such that a state quantity indicating a state of charge of the second power storage device becomes greater than usual.

More preferably, the power conversion unit includes first to third power conversion devices. The first power conversion device selectively performs third power conversion converting the power supplied from the outside of the vehicle into charging power for the first power storage device, and fourth power conversion converting power stored in the first power storage device into the output power to the outside of the vehicle. The second power conversion device selectively performs fifth power conversion converting the power supplied from the outside of the vehicle into charging power for the second power storage device, and sixth power conversion converting power stored in the second power storage device into the output power to the outside of the vehicle. The third power conversion device converts the power stored in the first power storage device into the power for the auxiliary machine. The second power conversion device has a power rating lower than that of the third power conversion device. The control method further includes the step of switching, when the charging of the power storage unit is performed by the power conversion unit in the predetermined situation, between a first charging path for charging the second power storage device using the second power conversion device and a second charging path for charging the second power storage device using the first and third power conversion devices, depending on efficiency during the charging of the power storage unit from the outside of the vehicle.

In the present invention, the power storage unit is charged more than usual when charging of the power storage unit from the outside of the vehicle is performed by the power conversion unit in a predetermined situation where power or a power amount to be output to the outside of the vehicle is requested to be greater than usual. Therefore, according to the present invention, power or a power amount which is greater than usual can be output to the outside of the vehicle in the predetermined situation.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present invention will be described in detail with reference to the drawings, in which identical or corresponding parts will be designated by the same reference numerals, and the description thereof will not be repeated.

Embodiment 1

Figure 1:
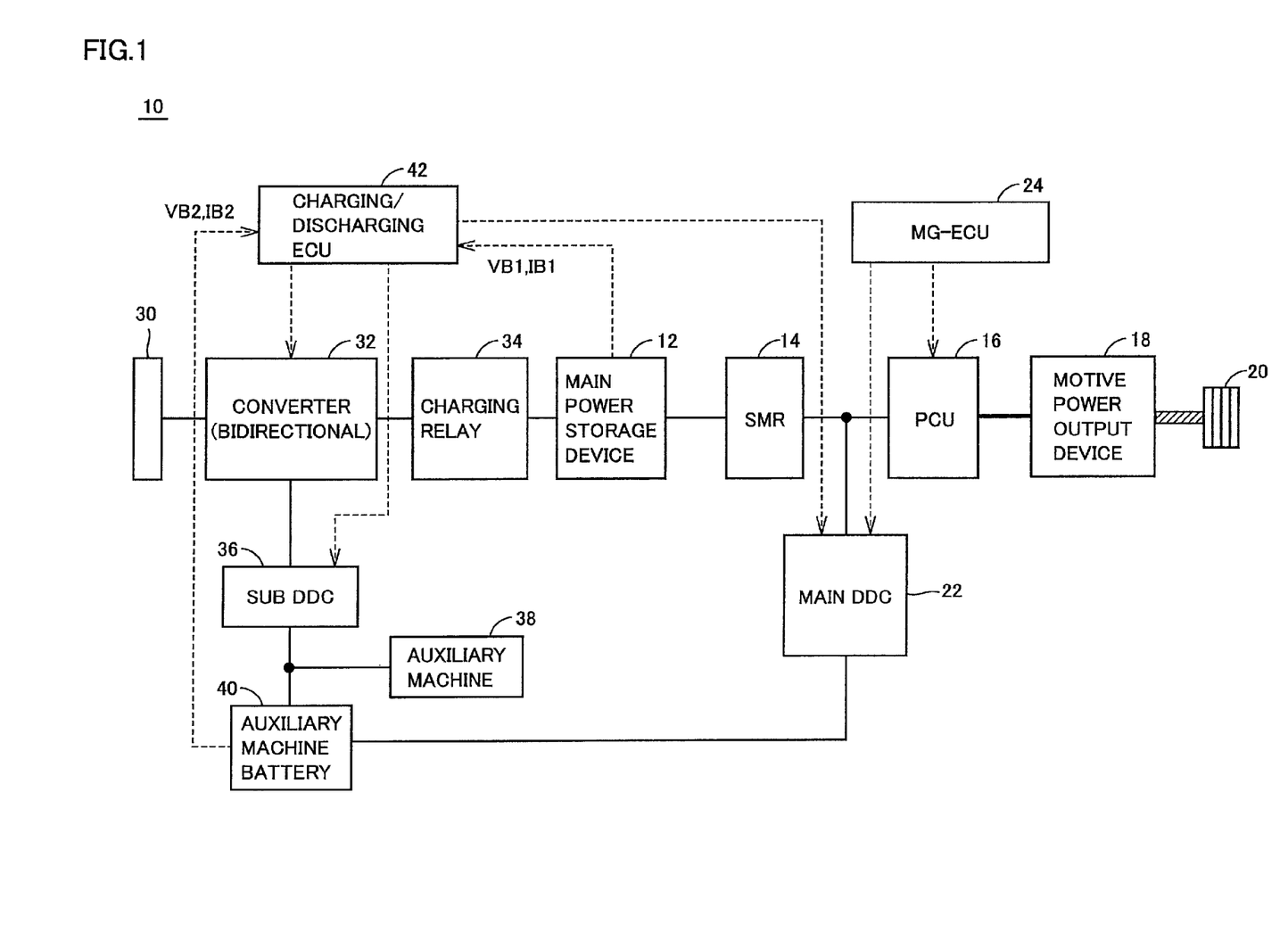
FIG. 1 is an overall configuration diagram of a vehicle equipped with a power supply system in accordance with Embodiment 1 of the present invention.

FIG. 1 is an overall configuration diagram of a vehicle equipped with a power supply system in accordance with Embodiment 1 of the present invention. Referring to FIG. 1, a vehicle 10 includes a main power storage device 12, a system main relay (hereinafter referred to as an "SMR") 14, a power control unit (hereinafter referred to as a "PCU") 16, a motive power output device 18, drive wheels 20, a main DC-DC converter 22, and an MG-ECU (Electronic Control Unit) 24.

Main power storage device 12 stores power for traveling. Main power storage device 12 is a chargeable/dischargeable direct-current (DC) power supply, and is composed of, for example, a secondary battery such as a nickel hydride battery and a lithium ion battery. In main power storage device 12, power supplied from an external power supply (not shown) and power generated in motive power output device 18 are stored. It is noted that a large-capacity capacitor can also be employed as main power storage device 12. SMR 14 is provided between main power storage device 12 and PCU 16. SMR 14 is a relay for establishing electrical connection/disconnection between main power storage device 12 and PCU 16.

PCU 16 collectively refers to power conversion devices for receiving power from main power storage device 12 to drive motive power output device 18. For example, PCU 16 includes an inverter for driving a motor included in motive power output device 18, a converter boosting the power output from main power storage device 12, and the like. Motive power output device 18 collectively refers to devices for driving drive wheels 20. For example, motive power output device 18 includes the motor, an engine, and the like driving drive wheels 20. Further, motive power output device 18 generates electric power by the motor driving drive wheels 20 during braking of the vehicle and the like, and outputs the generated electric power to PCU 16.

Main DC-DC converter 22 is connected to a power line between SMR 14 and PCU 16. Main DC-DC converter 22 is provided to generate electric power for an auxiliary machine while the vehicle is traveling (including the case where the vehicle stops to wait for a traffic light, and the like). In accordance with a control command from MG-ECU 24, main DC-DC converter 22 converts power received from main power storage device 12 or PCU 16 into the power for the auxiliary machine, and outputs it to an auxiliary machine 38 and a power storage device 40 for the auxiliary machine (described later). It is noted that, in Embodiment 1, depending on circumstances, main DC-DC converter 22 can also operate during external charging, as described later.

MG-ECU 24 controls PCU 16 which drives motive power output device 18, by software processing performed by executing a prestored program by a central processing unit (CPU) and/or hardware processing performed by a dedicated electronic circuit. Further, when a remaining capacity of power storage device 40 for the auxiliary machine is decreased while the vehicle is traveling (including the case where the vehicle stops to wait for a traffic light, and the like), MG-ECU 24 controls main DC-DC converter 22 to charge power storage device 40 for the auxiliary machine by main DC-DC converter 22.

Vehicle 10 further includes a power supplying/receiving unit 30, a bidirectional converter 32, a charging relay 34, a sub DC-DC converter 36, auxiliary machine 38, power storage device 40 for the auxiliary machine, and a charging/discharging ECU 42.

Power supplying/receiving unit 30 receives power supplied from an external power supply or an electric load outside the vehicle not shown (hereinafter also collectively referred to as "external power supply and the like") during external charging, and outputs power stored in main power storage device 12 and/or power storage device 40 for the auxiliary machine to the external power supply and the like during external discharging. Power supplying/receiving unit 30 may be configured to supply and receive power to and from the external power supply and the like by being connected to a power cable connected to the external power supply and the like, or may be configured to supply and receive power to and from the external power supply and the like in a non-contact manner using a non-contact power transmission technique such as electromagnetic induction or a so-called resonance method.

Bidirectional converter 32 is provided between power supplying/receiving unit 30 and main power storage device 12. Charging relay 34 is further provided between bidirectional converter 32 and main power storage device 12. During external charging, in accordance with a control command from charging/discharging ECU 42, bidirectional converter 32 converts the power supplied from the external power supply and input from power supplying/receiving unit 30 into charging power for main power storage device 12, and outputs the converted power to main power storage device 12. Further, sub DC-DC converter 36 is connected to bidirectional converter 32. During external charging, bidirectional converter 32 outputs the power received by power supplying/receiving unit 30 to sub DC-DC converter 36. It is noted that a configuration of connection between bidirectional converter 32 and sub DC-DC converter 36 will be described later with reference to a circuit diagram.

In addition, during external discharging, in accordance with a control command from charging/discharging ECU 42, bidirectional converter 32 converts the power stored in main power storage device 12 and power received from sub DC-DC converter 36 into output power to the external power supply and the like, and outputs the converted power to power supplying/receiving unit 30. In accordance with a control command from charging/discharging ECU 42, charging relay 34 establishes electrical connection/disconnection between bidirectional converter 32 and main power storage device 12.

Sub DC-DC converter 36 is connected to bidirectional converter 32. Sub DC-DC converter 36 is provided to generate power for the auxiliary machine during external charging. When sub DC-DC converter 36 receives a control command from charging/discharging ECU 42 during external charging, sub DC-DC converter 36 converts the power received from bidirectional converter 32 into the power for the auxiliary machine, and outputs it to auxiliary machine 38 and power storage device 40 for the auxiliary machine. Further, during external discharging, in accordance with a control command from charging/discharging ECU 42, sub DC-DC converter 36 converts power stored in power storage device 40 for the auxiliary machine into power to be output from power supplying/receiving unit 30 to the external power supply and the like, and outputs the converted power to bidirectional converter 32.

Auxiliary machine 38 collectively refers to auxiliary machines mounted in vehicle 10. Auxiliary machine 38 operates upon receiving supply of power from power storage device 40 for the auxiliary machine. Further, while sub DC-DC converter 36 is operating during external charging, auxiliary machine 38 operates upon receiving supply of power from sub DC-DC converter 36. It is noted that auxiliary machine 38 has different magnitudes of loads during traveling and during external charging and external discharging (hereinafter also referred to as "during external charging/discharging"), that is, auxiliary machine 38 has a high load during traveling, and has a low load during external charging/discharging (because auxiliary machines to be operated are limited). Thus, the power rating of sub DC-DC converter 36 is designed to have a value lower than that of main DC-DC converter 22.

Power storage device 40 for the auxiliary machine stores operating power for auxiliary machine 38, MG-ECU 24, charging/discharging ECU 42, and the like. Power storage device 40 for the auxiliary machine is a chargeable/dischargeable DC power supply, and is composed of, for example, a secondary battery such as a lithium ion battery, a nickel hydride battery, and a lead battery.

Charging/discharging ECU 42 controls external charging and external discharging, by software processing performed by executing a prestored program by a CPU and/or hardware processing performed by a dedicated electronic circuit. Specifically, charging/discharging ECU 42 calculates a remaining capacity (SOC) of main power storage device 12 using a voltage VB1 and/or a current IB1 of main power storage device 12, and calculates an SOC of power storage device 40 for the auxiliary machine using a voltage VB2 and/or a current IB2 of power storage device 40 for the auxiliary machine. It is noted that various known methods can be used to calculate the SOC. Further, the voltage and the current of each of main power storage device 12 and power storage device 40 for the auxiliary machine are detected by a voltage sensor and a current sensor not shown.

During external charging, charging/discharging ECU 42 generates a control signal for driving bidirectional converter 32 to convert the power input from power supplying/receiving unit 30 into the charging power for the main power storage device, based on the SOC of main power storage device 12, and outputs the generated control signal to bidirectional converter 32. Further, during external charging, charging/discharging ECU 42 generates a control signal for driving sub DC-DC converter 36 as necessary, and outputs the generated control signal to sub DC-DC converter 36.

Here, when external charging is performed in a predetermined emergency, charging/discharging ECU 42 controls sub DC-DC converter 36 or main DC-DC converter 22 such that the SOC of power storage device 40 for the auxiliary machine becomes greater than usual, to ensure more power (W) or power amount (Wh) which can be externally discharged from vehicle 10. Here, an "emergency" refers to a situation where a commercial system power supply fails or a power failure thereof is expected, and more specifically, where a commercial system power supply connected to an electric load receiving supply of power from power supplying/receiving unit 30 during external discharging fails, or a power failure thereof is expected. Examples of the situation where external charging is performed in an emergency include, but are not limited to, a situation where external charging is performed when a power failure of a commercial system power supply is scheduled (i.e., in an emergency), and a situation where, when a commercial system power supply in a region fails (i.e., in an emergency), external charging is performed at a charging station and the like in a region other than the region where power fails. In addition, "usual" described above refers to not being in the above "emergency".

Although it has been described above to set the SOC of power storage device 40 for the auxiliary machine to be greater than usual when external charging is performed in an emergency, to ensure more power (W) or power amount (Wh) which can be externally discharged, the SOC of main power storage device 12 may be set to be greater than usual. However, since main power storage device 12 is charged to a high SOC also in usual external charging, main power storage device 12 has little room for further charging, and thus it is preferable to charge power storage device 40 for the auxiliary machine, which has room for charging greater than that of main power storage device 12. Further, although it has been described above to set the SOC of power storage device 40 for the auxiliary machine to be greater than usual, voltage VB2 of power storage device 40 for the auxiliary machine may be set to be greater than usual, instead of the SOC thereof.

In addition, in Embodiment 1, when external charging is performed in an emergency, a charging path for charging power storage device 40 for the auxiliary machine can be switched between a charging path using sub DC-DC converter 36 and a charging path using main DC-DC converter 22. Which charging path is to be used to charge power storage device 40 for the auxiliary machine is determined based on efficiency during charging of power storage device 40 for the auxiliary machine. Namely, as described above, sub DC-DC converter 36 has a power rating lower than that of main DC-DC converter 22, and higher power conversion efficiency is obtained when sub DC-DC converter 36 is used to generate power for auxiliary machine 38 and power storage device 40 for the auxiliary machine during external charging. However, since power storage device 40 for the auxiliary machine is charged such that the SOC thereof becomes greater than usual when external charging is performed in an emergency, if power storage device 40 for the auxiliary machine is charged using sub DC-DC converter 36 having a lower power rating, a charging time may be considerably increased.

Thus, in Embodiment 1, when external charging is performed in an emergency, a charging time for charging power storage device 40 for the auxiliary machine by sub DC-DC converter 36 is compared with a charging time for charging main power storage device 12, and when the charging time for charging power storage device 40 for the auxiliary machine is longer than the charging time for charging main power storage device 12, main DC-DC converter 22 having a higher power rating is operated (sub DC-DC converter 36 is stopped), and power storage device 40 for the auxiliary machine is charged by main DC-DC converter 22. This can prevent an increase in an external charging time due to an increase in the charging time for charging power storage device 40 for the auxiliary machine by sub DC-DC converter 36 when external charging is performed in an emergency.

On the other hand, when the charging time for charging power storage device 40 for the auxiliary machine is not more than the charging time for charging main power storage device 12 when external charging is performed in an emergency, power storage device 40 for the auxiliary machine is charged by sub DC-DC converter 36 (without operating main DC-DC converter 22). Thereby, power storage device 40 for the auxiliary machine can be charged using sub DC-DC converter 36, which has relatively higher power conversion efficiency than that of main DC-DC converter 22 during external charging.

Figure 2:
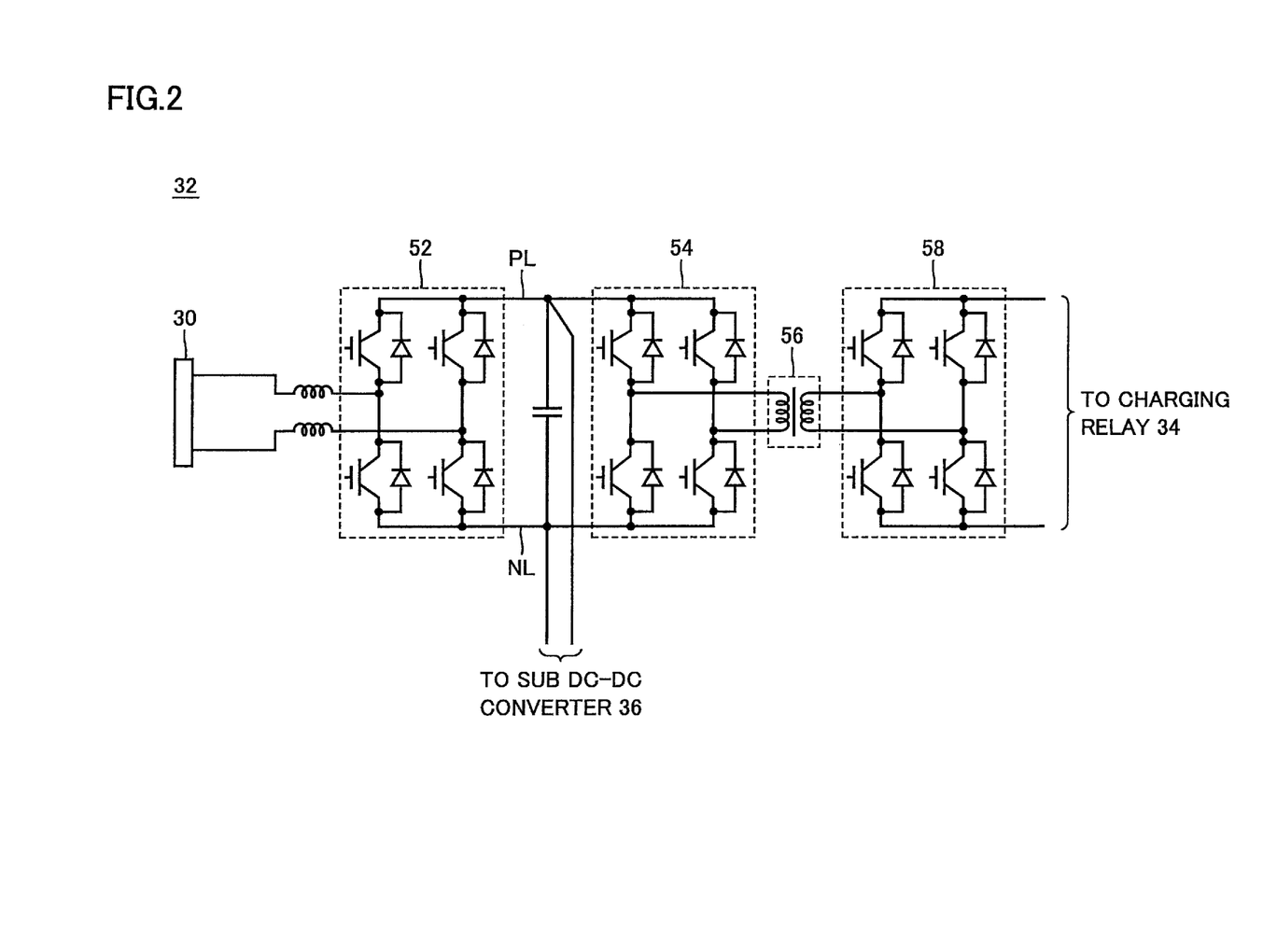
FIG. 2 is a circuit diagram of a bidirectional converter shown in FIG. 1.

FIG. 2 is a circuit diagram of bidirectional converter 32 shown in FIG. 1. Referring to FIG. 2, bidirectional converter 32 includes conversion units 52, 54, 58, and an insulation transformer 56. Each of conversion units 52, 54, 58 is composed of a single-phase bridge circuit capable of converting power bi-directionally.

Conversion unit 52 converts alternating current (AC) power from the external power supply input from power supplying/receiving unit 30 into DC power, and outputs it to a positive electrode line PL and a negative electrode line NL, based on a control signal from charging/discharging ECU 42 (FIG. 1). Conversion unit 52 can also convert DC power received from positive electrode line PL and negative electrode line NL into AC power, and output it to power supplying/receiving unit 30. Conversion unit 54 converts the DC power received from conversion unit 52 into AC power and outputs it to insulation transformer 56, based on a control signal from charging/discharging ECU 42. Conversion unit 54 can also convert AC power received from insulation transformer 56 into DC power and output it to conversion unit 52.

Insulation transformer 56 includes a core made of a magnetic material, and a primary coil and a secondary coil wound around the core. The primary coil and the secondary coil are electrically insulated, and are connected to conversion units 54, 58, respectively. Insulation transformer 56 converts the AC power from conversion unit 54 to have a voltage level corresponding to a turn ratio between the primary coil and the secondary coil, and outputs it to conversion unit 58. Insulation transformer 56 can also convert AC power from conversion unit 58 to have a voltage level corresponding to a turn ratio between the secondary coil and the primary coil, and output it to conversion unit 54.

Conversion unit 58 converts the AC power received from insulation transformer 56 into DC power and outputs it to charging relay 34 (FIG. 1), based on a control signal from charging/discharging ECU 42. Conversion unit 58 can also convert DC power supplied from charging relay 34 into AC power, and output it to insulation transformer 56.

Sub DC-DC converter 36 (FIG. 1) is connected to positive electrode line PL and negative electrode line NL provided between conversion units 52 and 54. It is noted that, although not particularly shown, sub DC-DC converter 36 may be connected to an output side of conversion unit 58 (the charging relay 34 side).

Referring to FIG. 1 again, in Embodiment 1, when external charging is performed in an emergency, power storage device 40 for the auxiliary machine is charged such that the SOC of power storage device 40 for the auxiliary machine becomes greater than usual, to ensure more power or power amount which can be subsequently externally discharged. Thereby, the charging time for charging power storage device 40 for the auxiliary machine by sub DC-DC converter 36 is increased. However, in Embodiment 1, the charging path for charging power storage device 40 for the auxiliary machine is configured such that it can be switched between the path through sub DC-DC converter 36 (a path A) and the path through main DC-DC converter 22 (a path B). When the charging time for charging power storage device 40 for the auxiliary machine by sub DC-DC converter 36 is longer than the charging time for charging main power storage device 12, power storage device 40 for the auxiliary machine is charged using main DC-DC converter 22 having a power rating higher than that of sub DC-DC converter 36, in order to shorten the external charging time.

Figure 3:
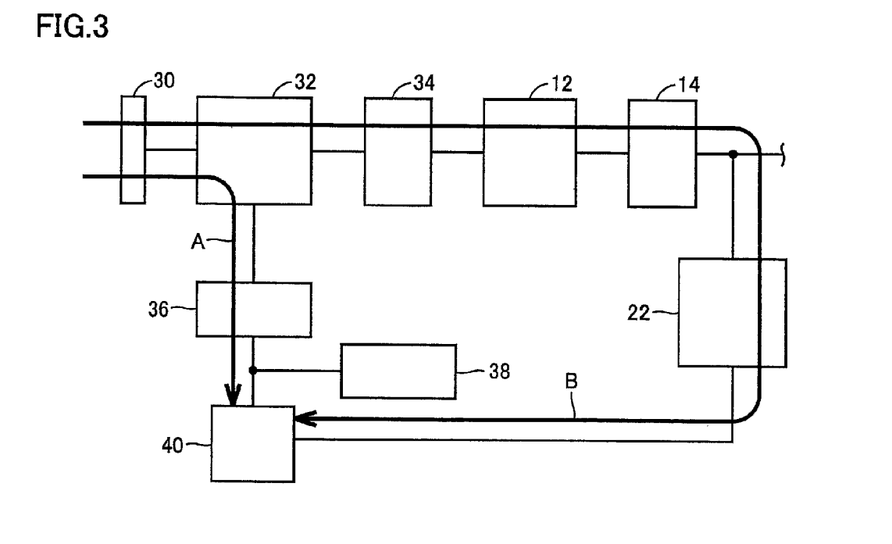
FIG. 3 is a view showing charging paths for charging a power storage device for an auxiliary machine during external charging.

FIG. 3 is a view showing the charging paths for charging power storage device 40 for the auxiliary machine during external charging. Referring to FIG. 3, path A is the charging path through sub DC-DC converter 36. That is, the power supplied from the external power supply (not shown) connected to power supplying/receiving unit 30 is supplied to power storage device 40 for the auxiliary machine, by sequentially passing through power supplying/receiving unit 30, bidirectional converter 32, and sub DC-DC converter 36 connected to bidirectional converter 32.

Path B is the charging path through main DC-DC converter 22. That is, the power supplied from the external power supply connected to power supplying/receiving unit 30 is supplied to power storage device 40 for the auxiliary machine, by sequentially passing through power supplying/receiving unit 30, bidirectional converter 32, charging relay 34, main power storage device 12, SMR 14, and main DC-DC converter 22.

Sub DC-DC converter 36 only needs to generate operating power for the auxiliary machine and the ECU operating during external charging, and sub DC-DC converter 36 has a power rating lower than that of main DC-DC converter 22. Higher power conversion efficiency is obtained when sub DC-DC converter 36 is used to generate power for auxiliary machine 38 and power storage device 40 for the auxiliary machine during external charging, and path A has higher power conversion efficiency than that of path B.

However, since sub DC-DC converter 36 has a lower power rating, the charging time for charging power storage device 40 for the auxiliary machine through path A is longer than that through path B. When the charging time for charging power storage device 40 for the auxiliary machine through path A is not more than the charging time for charging main power storage device 12 (i.e., when the SOC of main power storage device 12 before external charging is decreased), the external charging time is not increased by charging power storage device 40 for the auxiliary machine. On the other hand, when the charging time for charging power storage device 40 for the auxiliary machine through path A is longer than the charging time for charging main power storage device 12 (i.e., when the SOC of main power storage device 12 before external charging is not so decreased, and the charging time for charging main power storage device 12 is not long), the external charging time is increased by charging power storage device 40 for the auxiliary machine.

Thus, in Embodiment 1, the charging path for charging power storage device 40 for the auxiliary machine during external charging can be switched between paths A and B. In addition, when the charging for charging power storage device 40 for the auxiliary machine through path A is longer than the charging time for charging main power storage device 12 due to an increase in a charging amount of power storage device 40 for the auxiliary machine in an emergency, the charging path is switched to path B which uses main DC-DC converter 22 having a power rating higher than that of sub DC-DC converter 36, to charge power storage device 40 for the auxiliary machine.

Figure 4:
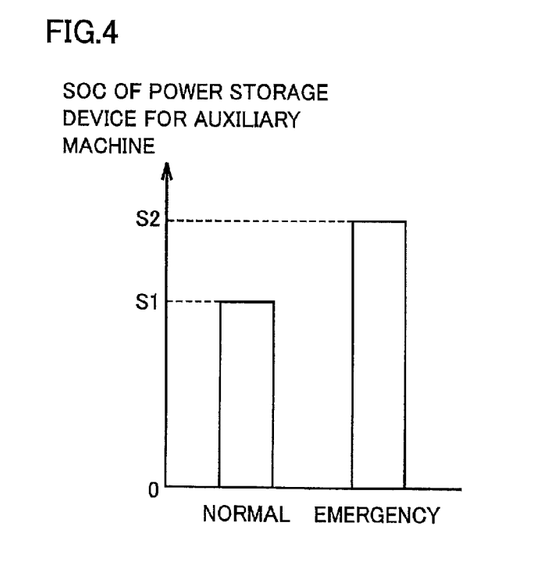
FIG. 4 is a view showing target SOCs of the power storage device for the auxiliary machine.

FIG. 4 is a view showing target SOCs of power storage device 40 for the auxiliary machine. Referring to FIG. 4, in a usual situation (i.e., in a situation other than the above "emergency"), the SOC of power storage device 40 for the auxiliary machine is controlled to S1. On the other hand, in an emergency, the SOC of power storage device 40 for the auxiliary machine is controlled to S2, which is higher than S1, to allow more power to be supplied from power storage device 40 for the auxiliary machine to the outside of the vehicle.

Figure 5:
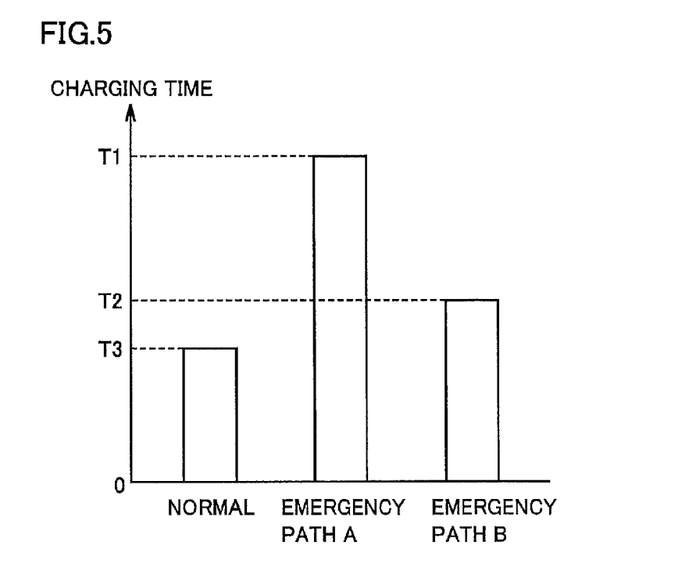
FIG. 5 is a first view for comparatively illustrating external charging times.
Figure 6:
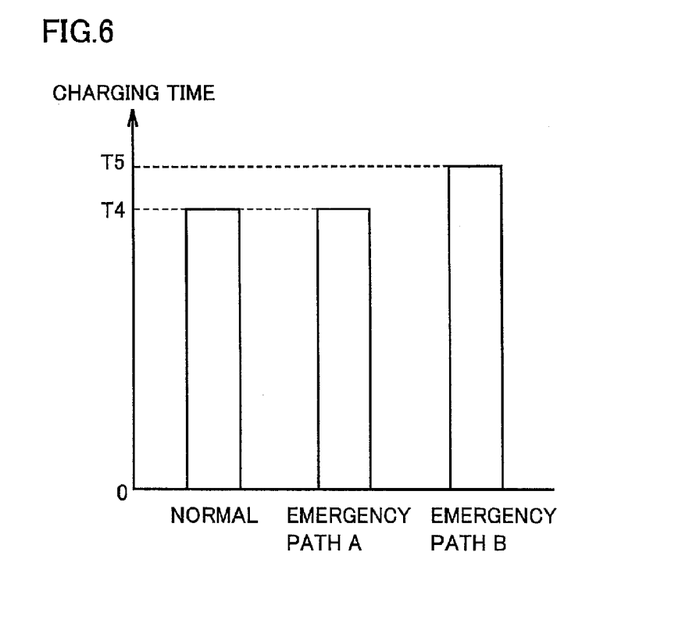
FIG. 6 is a second view for comparatively illustrating external charging times.

FIGS. 5 and 6 are views for comparatively illustrating external charging times. FIG. 5 shows comparison of external charging times when the SOC of main power storage device 12 before external charging is relatively high, and FIG. 6 shows comparison of external charging times when the SOC of main power storage device 12 before external charging is decreased.

Referring to FIG. 5, a charging time T3 in a normal situation is substantially equivalent to the charging time for charging main power storage device 12. Since the SOC of main power storage device 12 is relatively high, charging time T3 is not so long. When path A is selected in an emergency, the charging time for charging power storage device 40 for the auxiliary machine by sub DC-DC converter 36 is longer than the charging time for charging main power storage device 12, and a charging time T1 (>T3) is obtained. When path B is selected, power storage device 40 for the auxiliary machine is charged using main DC-DC converter 22 having a power rating higher than that of sub DC-DC converter 36, and thus a charging time T2 (<T1) is obtained. Therefore, in such a case, path B is selected.

Referring to FIG. 6, a charging time T4 in a normal situation is substantially equivalent to the charging time for charging main power storage device 12. Since the SOC of main power storage device 12 before external charging is decreased, charging time T4 is longer. Accordingly, even when path A is selected in an emergency, the charging time for charging power storage device 40 for the auxiliary machine by sub DC-DC converter 36 is shorter than the charging time for charging main power storage device 12, and charging time T4 is also obtained in this case. When path B is selected, a charging time T5 is longer than T4 by the amount corresponding to charging of power storage device 40 for the auxiliary machine by main DC-DC converter 22. Therefore, in such a case, path A is selected.

Figure 7:
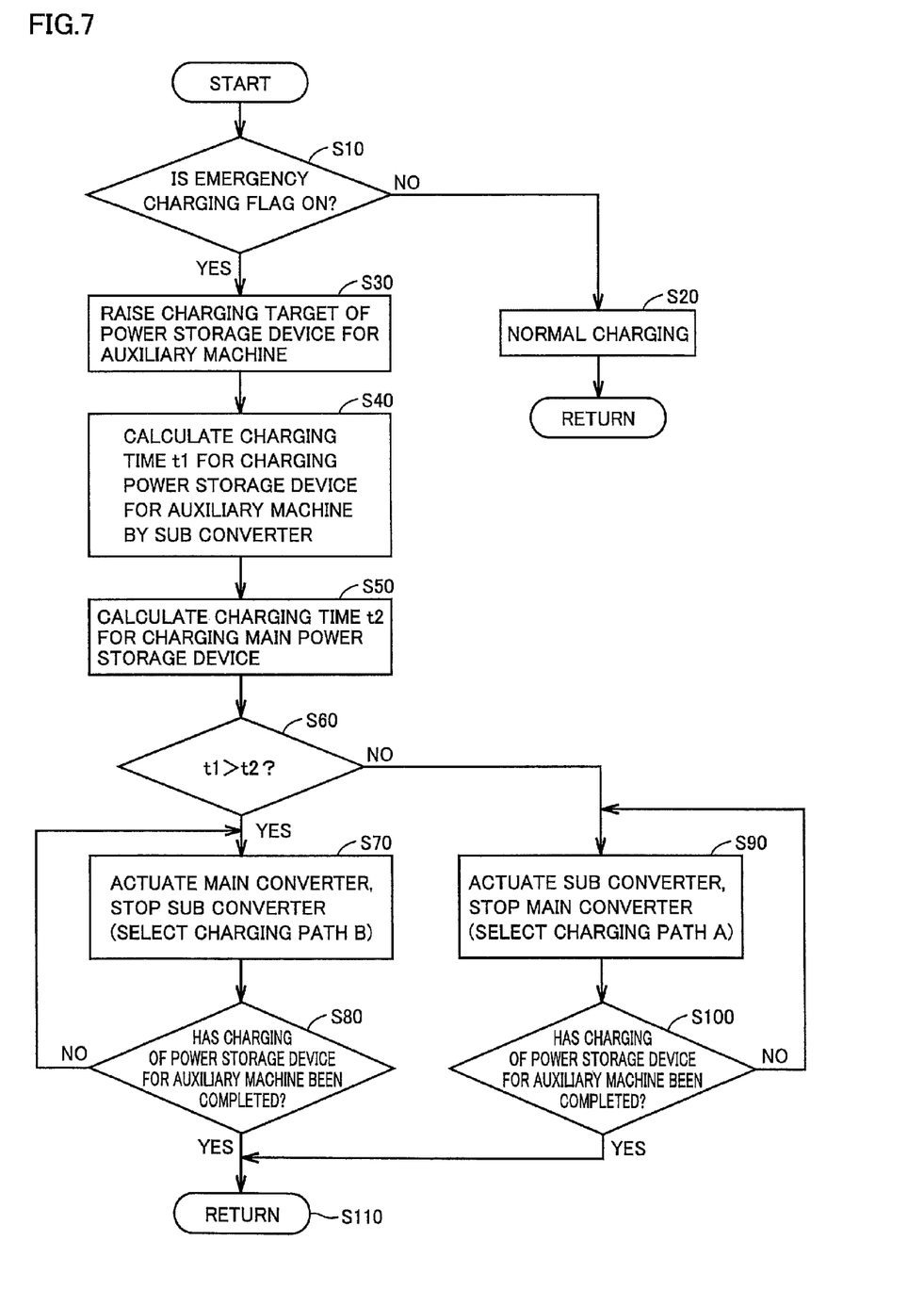
FIG. 7 is a flowchart for illustrating a processing procedure for charging the power storage device for the auxiliary machine during external charging.

FIG. 7 is a flowchart for illustrating a processing procedure for charging power storage device 40 for the auxiliary machine during external charging. Referring to FIG. 7, charging/discharging ECU 42 (FIG. 1) determines whether or not an emergency charging flag is ON (step S10). The emergency charging flag is a flag which is turned on when the above "emergency" is recognized. For example, the emergency charging flag may be received from the outside of the vehicle by a communication device not shown, or may be able to be input by the user of the vehicle through a switch or the like.

When it is determined in step S10 that the emergency charging flag is ON (YES in step S10), charging/discharging ECU 42 raises a charging target of power storage device 40 for the auxiliary machine (step S30). For example, charging/discharging ECU 42 raises a target SOC indicating a target of the SOC of power storage device 40 for the auxiliary machine, or a target voltage indicating a target of the voltage of power storage device 40 for the auxiliary machine, to be higher than usual.

Subsequently, charging/discharging ECU 42 calculates a charging time t1 for charging power storage device 40 for the auxiliary machine by sub DC-DC converter 36 (step S40). For example, charging/discharging ECU 42 can calculate the SOC of power storage device 40 for the auxiliary machine based on voltage VB2 and/or current IB2 of power storage device 40 for the auxiliary machine, and calculate charging time t1 based on a difference between the calculated SOC and the target SOC, and power (W) which can be supplied from sub DC-DC converter 36 to power storage device 40 for the auxiliary machine.

Further, charging/discharging ECU 42 calculates a charging time t2 for charging main power storage device 12 (step S50). For example, charging/discharging ECU 42 can calculate the SOC of main power storage device 12 based on voltage VB1 and/or current IB1 of main power storage device 12, and calculate charging time t2 based on a difference between the calculated SOC and a target SOC of main power storage device 12, and power (W) which can be supplied from bidirectional converter 32 to main power storage device 12.

Then, charging/discharging ECU 42 determines whether or not charging time t1 calculated in step S40 is longer than charging time t2 calculated in step S50 (step S60). When it is determined that charging time t1 is longer than charging time t2 (YES in step S60), i.e., when it is determined that the charging time for charging power storage device 40 for the auxiliary machine through path A is longer than the charging time for charging main power storage device 12, charging/discharging ECU 42 actuates main DC-DC converter 22 and stops sub DC-DC converter 36 (step S70). That is, path B is selected as a charging route for charging power storage device 40 for the auxiliary machine.

Thereafter, charging/discharging ECU 42 determines whether or not charging of power storage device 40 for the auxiliary machine by main DC-DC converter 22 has been completed (step S80). When it is determined that the charging of power storage device 40 for the auxiliary machine has been completed (YES in step S80), the processing proceeds to step S110, and when it is determined that the charging of power storage device 40 for the auxiliary machine has not been completed (NO in step S80), the processing goes back to step S70.

On the other hand, when it is determined in step S60 that charging time t1 is not more than charging time t2 (NO in step S60), i.e., when it is determined that the charging time for charging power storage device 40 for the auxiliary machine through path A is not more than the charging time for charging main power storage device 12, charging/discharging ECU 42 actuates sub DC-DC converter 36 and stops main DC-DC converter 22 (step S90). That is, path A is selected as a charging route for charging power storage device 40 for the auxiliary machine.

Thereafter, charging/discharging ECU 42 determines whether or not charging of power storage device 40 for the auxiliary machine by sub DC-DC converter 36 has been completed (step S100). When it is determined that the charging of power storage device 40 for the auxiliary machine has been completed (YES in step S100), the processing proceeds to step S110, and when it is determined that the charging of power storage device 40 for the auxiliary machine has not been completed (NO in step S100), the processing goes back to step S90.

It is noted that, when it is determined in step S10 that the emergency charging flag is OFF (NO in step S10), charging/discharging ECU 42 performs usual external charging (step S20). That is, charging/discharging ECU 42 does not raise the charging target of power storage device 40 for the auxiliary machine, and operates sub DC-DC converter 36 to generate operating power for auxiliary machine 38 by sub DC-DC converter 36 (main DC-DC converter 22 is stopped).

As described above, in Embodiment 1, when external charging is performed in an emergency, power storage device 40 for the auxiliary machine (main power storage device 12 may also be included) is charged more than usual. Therefore, according to Embodiment 1, power or a power amount which is greater than usual can be supplied to the outside of the vehicle in an emergency.

Further, in Embodiment 1, when external charging is performed in an emergency, the charging path for charging power storage device 40 for the auxiliary machine can be switched between path A using sub DC-DC converter 36 and path B using main DC-DC converter 22. Therefore, according to Embodiment 1, external charging can be efficiently performed by switching between paths A and B depending on efficiency during external charging.

Furthermore, in Embodiment 1, when the charging time for charging power storage device 40 for the auxiliary machine through path A is longer than the charging time for charging main power storage device 12, power storage device 40 for the auxiliary machine is charged through path B. When the charging time for charging power storage device 40 for the auxiliary machine through path A is not more than the charging time for charging main power storage device 12, power storage device 40 for the auxiliary machine is charged through path A. Therefore, according to Embodiment 1, an increase in the charging time due to an increase in the charging amount of power storage device 40 for the auxiliary machine in an emergency can be suppressed.

Embodiment 2

In Embodiment 1 described above, when external charging is performed in an emergency, the charging amount of power storage device 40 for the auxiliary machine is controlled to become greater than usual to ensure more power (W) or power amount (Wh) which can be externally discharged, and the charging path for charging power storage device 40 for the auxiliary machine can be switched between paths A and B to suppress an increase in the charging time due to an increase in the charging amount.

In Embodiment 2, an input unit is provided which allows the user to instruct that more power or power amount which can be externally discharged be ensured regardless of whether or not the situation is in an "emergency", and the charging target of power storage device 40 for the auxiliary machine is raised based on an input through the input unit. It is noted that selection of the charging path (path A or B) when the charging target of power storage device 40 for the auxiliary machine is raised is identical to that in Embodiment 1.

Figure 8:
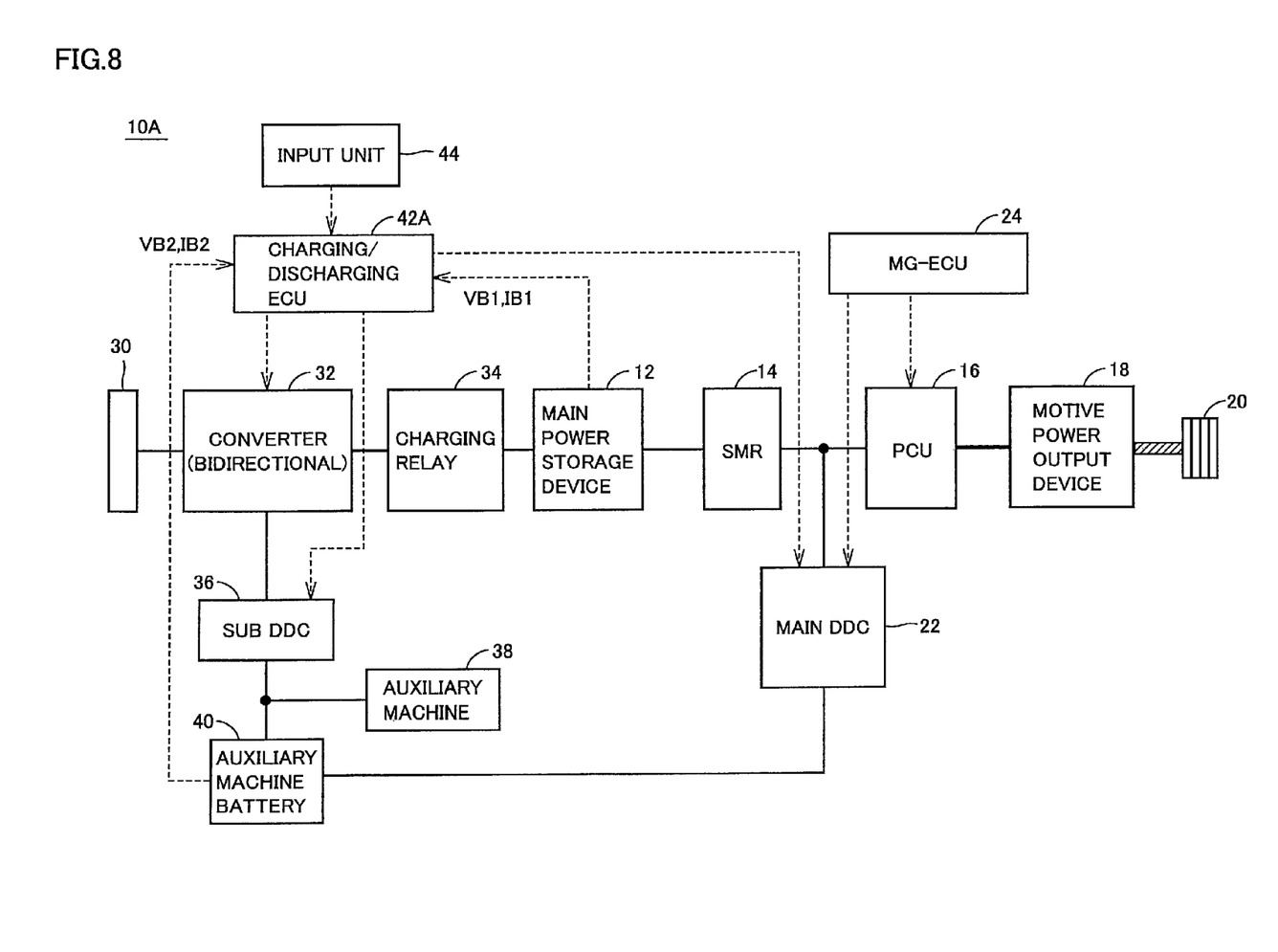
FIG. 8 is an overall configuration diagram of a vehicle equipped with a power supply system in accordance with Embodiment 2.

FIG. 8 is an overall configuration diagram of a vehicle equipped with a power supply system in accordance with Embodiment 2. Referring to FIG. 8, a vehicle 10A further includes an input unit 44, and includes a charging/discharging ECU 42A instead of charging/discharging ECU 42, in the configuration of vehicle 10 in Embodiment 1 shown in FIG. 1.

Input unit 44 is a manipulation switch for allowing the user to request that power or a power amount to be output to the outside of the vehicle when external discharging is performed be greater than usual. If input unit 44 is turned on by the user when external charging is performed, charging/discharging ECU 42A raises the charging target (target SOC or target voltage) of power storage device 40 for the auxiliary machine. It is noted that other functions of charging/discharging ECU 42A are identical to those of charging/discharging ECU 42 in Embodiment 1 shown in FIG. 1.

As described above, according to Embodiment 2, more power or power amount which can be externally discharged can be ensured upon the user's request. Further, according to Embodiment 2, external charging can be efficiently performed by switching between paths A and B depending on efficiency during external charging, and an increase in the charging time due to an increase in the charging amount of power storage device 40 for the auxiliary machine upon the user's request can be suppressed, as in Embodiment 1.

It is noted that, in the above description, main power storage device 12 corresponds to one embodiment of a "first power storage device" in the present invention, and power storage device 40 for the auxiliary machine corresponds to one embodiment of a "second power storage device" in the present invention. Further, bidirectional converter 32 corresponds to one embodiment of a "first power conversion device" in the present invention, and sub DC-DC converter 36 corresponds to one embodiment of a "second power conversion device" in the present invention. Furthermore, main DC-DC converter 22 corresponds to one embodiment of a "third power conversion device" in the present invention, and charging/discharging ECU 42, 42A corresponds to one embodiment of a "control device" in the present invention. Still further, input unit 44 corresponds to one embodiment of an "input manipulation unit" in the present invention.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A power supply system mounted in a vehicle, comprising:
    a chargeable/dischargeable power storage unit; and
    a power conversion unit selectively performing first power conversion converting power supplied from outside of the vehicle into charging power for said power storage unit, and second power conversion converting power stored in said power storage unit into output power to the outside of the vehicle,
    when charging of said power storage unit from the outside of the vehicle is performed by said power conversion unit in a predetermined situation, said predetermined situation including a first situation or a second situation, said power conversion unit performing said first power conversion such that a state quantity indicating a state of charge of said power storage unit becomes greater than the state quantity when not in the predetermined situation,
    wherein the first situation is a situation during a power failure of a commercial system power supply to which an electric load receiving the power output from said vehicle by performing said second power conversion is connected, or a situation where failure of the commercial system power supply is expected, and
    wherein the second situation is a situation where the power or power amount to be output to the outside of the vehicle by performing said second power conversion is increased in accordance with a request by a user.

2. The power supply system according to claim 1, wherein said power storage unit includes
    a first power storage device storing power for traveling, and
    a second power storage device storing power for an auxiliary machine, and
    when the charging of said power storage unit is performed by said power conversion unit in said predetermined situation, said power conversion unit performs said first power conversion such that a state quantity indicating a state of charge of said second power storage device becomes greater than the state quantity when not in the predetermined situation.

3. The power supply system according to claim 2, wherein said power conversion unit includes
    a first power conversion device selectively performing third power conversion converting the power supplied from the outside of the vehicle into charging power for said first power storage device, and fourth power conversion converting power stored in said first power storage device into the output power to the outside of the vehicle,
    a second power conversion device selectively performing fifth power conversion converting the power supplied from the outside of the vehicle into charging power for said second power storage device, and sixth power conversion converting power stored in said second power storage device into the output power to the outside of the vehicle, and a third power conversion device converting the power stored in said first power storage device into the charging power for said second power storage device, said third power conversion and said fifth power conversion are included in said first power conversion, said fourth power conversion and said sixth power conversion are included in said second power conversion, said second power conversion device has a power rating lower than that of said third power conversion device, said power supply system further comprises a control device controlling said first to third power conversion devices, and when the charging of said power storage unit is performed by said power conversion unit in said predetermined situation, said control device switches between a first charging path for charging said second power storage device using said second power conversion device and a second charging path for charging said second power storage device using said first and third power conversion devices, depending on efficiency during the charging of said power storage unit from the outside of the vehicle.

4. A vehicle comprising the power supply system according to claim 1.

5. A control method for a power supply system mounted in a vehicle, said power supply system including
a chargeable/dischargeable power storage unit, and
a power conversion unit selectively performing first power conversion converting power supplied from outside of the vehicle into charging power for said power storage unit, and second power conversion converting power stored in said power storage unit into output power to the outside of the vehicle, said control method comprising the steps of:
determining whether or not there arises a predetermined situation, said predetermined situation including a first situation or a second situation;

determining whether or not charging of said power storage unit from the outside of the vehicle is performed by said power conversion unit; and when the charging of said power storage unit is performed by said power conversion unit in said predetermined situation, performing said first power conversion such that a state quantity indicating a state of charge of said power storage unit becomes greater than the state quantity when not in the predetermined situation, wherein the first situation is a situation during a power failure of a commercial system power supply to which an electric load receiving the power output from said vehicle by performing said second power conversion is connected, or a situation where failure of the commercial system power supply is expected, and wherein the second situation is a situation where the power or power amount to be output to the outside of the vehicle by performing said second power conversion is increased in accordance with a request by a user.

6. The control method for the power supply system according to claim 5, wherein
said power storage unit includes
a first power storage device storing power for traveling, and
a second power storage device storing power for an auxiliary machine, and
the step of performing said first power conversion includes the step of performing said first power conversion, when the charging of said power storage unit is performed by said power conversion unit in said predetermined situation, such that a state quantity indicating a state of charge of said second power storage device becomes greater than the state quantity when not in the predetermined situation.

7. The control method for the power supply system according to claim 6, wherein
said power conversion unit includes
a first power conversion device selectively performing third power conversion converting the power supplied from the outside of the vehicle into charging power for said first power storage device, and fourth power conversion converting power stored in said first power storage device into the output power to the outside of the vehicle, a second power conversion device selectively performing fifth power conversion converting the power supplied from the outside of the vehicle into charging power for said second power storage device, and sixth power conversion converting power stored in said second power storage device into the output power to the outside of the vehicle, and a third power conversion device converting the power stored in said first power storage device into the charging power for said second power storage device, said third power conversion and said fifth power conversion are included in said first power conversion, said fourth power conversion and said sixth power conversion are included in said second power conversion, said second power conversion device has a power rating lower than that of said third power conversion device, said control method further comprises the step of switching, when the charging of said power storage unit is performed by said power conversion unit in said predetermined situation, between a first charging path for charging said second power storage device using said second power conversion device and a second charging path for charging said second power storage device using said first and third power conversion devices, depending on efficiency during the charging of said power storage unit from the outside of the vehicle.

* * * * *